United States Patent
Cahill

(10) Patent No.: US 8,029,074 B2
(45) Date of Patent: Oct. 4, 2011

(54) FAULT TOLERANT AIRCRAFT BRAKING CONTROL USING ALTERNATE WHEEL SPEED INFORMATION

(75) Inventor: Eric D. Cahill, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 12/593,887

(22) PCT Filed: Feb. 21, 2008

(86) PCT No.: PCT/US2008/054546
§ 371 (c)(1),
(2), (4) Date: Sep. 29, 2009

(87) PCT Pub. No.: WO2008/147579
PCT Pub. Date: Dec. 4, 2008

(65) Prior Publication Data
US 2010/0117447 A1 May 13, 2010

Related U.S. Application Data

(60) Provisional application No. 60/939,182, filed on May 21, 2007.

(51) Int. Cl.
*B60T 8/10* (2006.01)
(52) U.S. Cl. .................................. 303/122.03; 303/126

(58) Field of Classification Search ............. 303/122.03, 303/122.05, 191, 126; 244/111
See application file for complete search history.

(56) References Cited

U.S. PATENT DOCUMENTS

| | | | |
|---|---|---|---|
| 6,092,879 A * | 7/2000 | Kornhaas et al. ........ | 303/122.04 |
| 6,554,376 B2 * | 4/2003 | Schmitt et al. ................ | 303/191 |
| 6,851,649 B1 | 2/2005 | Radford | |
| 2007/0067085 A1 * | 3/2007 | Lu et al. ......................... | 701/70 |

FOREIGN PATENT DOCUMENTS

| | | |
|---|---|---|
| DE | 19511161 | 10/1996 |
| WO | 01/42070 | 6/2001 |
| WO | 03/039929 | 5/2003 |

OTHER PUBLICATIONS

International Preliminary Report on Patentability for PCT/US2008/054546, dated Nov. 21, 2009.
Written Opinion for PCT/US20081054546, dated Nov. 21, 2009.
Publication with International Search report for PCT/US2008/054546, dated Dec. 4, 2008.

* cited by examiner

*Primary Examiner* — Christopher Schwartz
(74) *Attorney, Agent, or Firm* — Snell & Wilmer L.L.P.

(57) ABSTRACT

A method for providing anti-skid braking control for a vehicle having a plurality of wheels, each wheel including a corresponding wheel speed sensor and brake, wherein when velocity data from at least one wheel speed sensor is lost, velocity data from a wheel speed sensor coupled to a different wheel is used as the wheel speed for the wheel with the non-operational sensor.

16 Claims, 5 Drawing Sheets

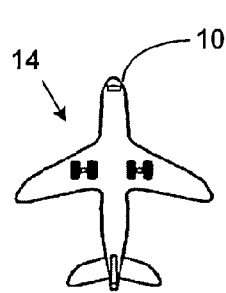 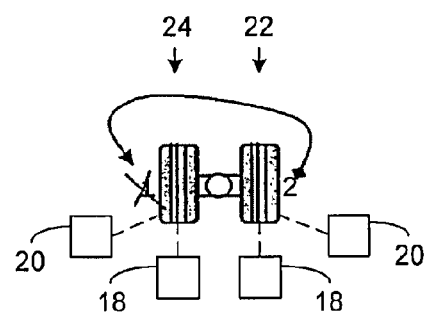 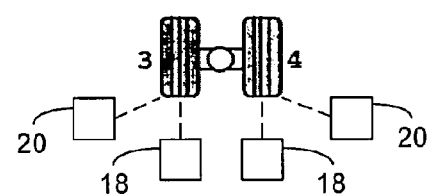
Fig. 1A　　　Fig. 1B　　　Fig. 1C
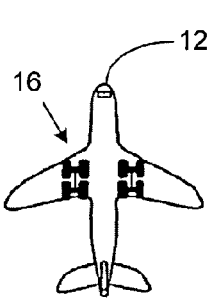 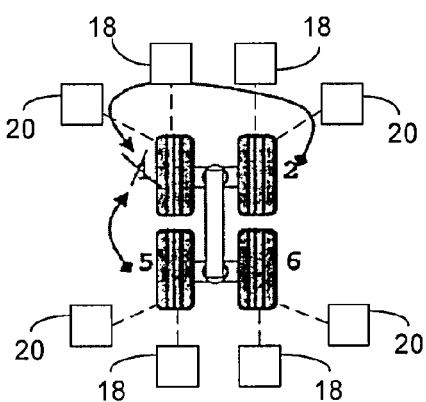 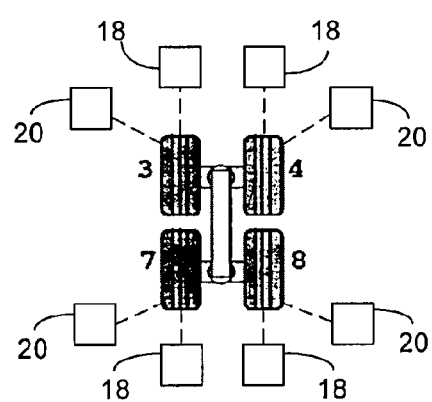
Fig. 2A　　　Fig. 2B　　　Fig. 2C

FAULT TOLERANT AIRCRAFT BRAKING CONTROL USING ALTERNATE WHEEL SPEED INFORMATION

CROSS-REFERENCE TO RELATED APPLICATIONS

This application is a U.S. National Phase filing under 35 U.S.C. 371 and claims priority to PCT Application No. PCT/US08/54546, filed on Feb. 21, 2008, and entitled "FAULT TOLERANT AIRCRAFT BRAKING CONTROL USING ALTERNATE WHEEL SPEED INFORMATION," which claims priority to U.S. Provisional Patent Application Ser. No. 60/939,182, filed May 21, 2007, both of which are incorporated herein by reference in their entirety.

FIELD OF THE INVENTION

The present invention relates generally to brakes and, more particularly, to a method, system and apparatus for providing subordinate anti-skid braking functionality when one or more wheel speed sensors become non-operational.

BACKGROUND OF THE INVENTION

Modern brake control systems monitor rotation of one or more wheels and modify a braking force applied to the wheel or brakes as necessary for proper braking. Such brake control systems are in widespread use in commercial and military aircraft, as well as in ground transportation vehicles. In use, these systems provide improved braking control, anti-skid and reduced stopping distances.

One of the central elements of such brake control systems is the wheel speed sensor or transducer, which provides data regarding the instantaneous wheel speed of the various wheels of the vehicle. An accurate measure of wheel speed is an important first step in detecting and then controlling braking conditions. Known wheel speed transducers convert a rotational speed of the associated wheel to electrical signals, and these signals then are employed by brake control circuitry, such as anti-skid control circuitry and/or automatic brake control circuitry, to control braking activity of the vehicle.

Conventional systems for monitoring wheel speed employ analog and/or digital sensors, wherein, for example, the wheel speed sensor produces a signal having a voltage or frequency that is proportional to the rotational speed of the wheel. The signal is transmitted from the sensor at each wheel to respective sensing and control circuits, which, for example, control the braking pressure to prevent skidding of the respective wheels.

If one or more wheel speed sensors fail or otherwise malfunction, anti-skid braking functionality may be lost. As will be appreciated, if such functionality is lost while the aircraft is on the ground, then the aircraft may not be authorized to fly, which can lead to flight delays. If such functionality is lost after the aircraft has become airborne, however, then aircraft braking may not be optimum.

SUMMARY OF THE INVENTION

The present invention enables anti-skid brake control to be maintained even when one or more wheel speed sensors malfunction. More particularly, wheel speed data from one or more wheels with operational wheel speed sensors is used as an indicator of wheel speed for the wheel with the malfunctioning wheel speed sensor. Further, a brake pressure signal provided to the malfunctioning wheel/brake/sensor combination may be conditioned relative to fully operational wheel/brake/sensor combinations so as to ensure that wheel skid does not occur. Conditioning can include, for example, limiting a maximum braking pressure (via a brake pressure command signal) to a fixed or variable offset below a brake pressure signal for a functional wheel/brake/sensor combination and/or varying or skewing a profile of the brake pressure signal relative to the brake pressure signal for the functional wheel/brake/sensor combination.

According to one aspect of the invention, there is provided a method for providing anti-skid braking control for a vehicle having a plurality of wheels, each wheel including a corresponding wheel speed sensor and brake, wherein when velocity data from at least one wheel speed sensor is lost, velocity data from a wheel speed sensor coupled to a different wheel is used as the wheel speed for the wheel with the non-operational sensor.

According to another aspect of the invention, a system for braking a vehicle having a plurality of wheels includes: a plurality of brakes, each brake of the plurality of brakes corresponding to one wheel of the plurality of wheels; a plurality of wheel speed sensors, each wheel speed sensor of the plurality of wheel speed sensors corresponding to one brake of the plurality of brakes; a brake controller operatively coupled to the plurality of brakes and to the plurality of wheel speed sensors, said brake controller including logic that determines if the wheel speed sensors are functional or malfunctional; and logic that generates the brake signal for a brake corresponding to a malfunctional wheel speed sensor based on wheel speed data from a functional wheel speed sensor.

According to another aspect of the invention, a brake controller for generating a braking signal for braking a vehicle having a plurality of wheels, each wheel including a corresponding brake and wheel speed sensor includes: a processor and memory; and a brake control code stored in memory and executable by the processor, said brake control code including i) code that determines if the plurality of wheel speed sensors are functional or malfunctional, ii) code that generates a brake signal for brakes corresponding to functional wheel speed sensors, said generation based on data from the corresponding functional wheel speed sensors, iii) and code that uses the generated brake signal as a brake signal for brakes corresponding to malfunctional wheel speed sensors.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed.

BRIEF DESCRIPTION OF THE DRAWINGS

The forgoing and other embodiments of the invention are hereinafter discussed with reference to the drawings.

FIGS. 1A-1C are schematic diagrams illustrating, respectively, an exemplary aircraft having twin landing gear, a first landing gear of the aircraft (wheels 1 and 2) having a faulty wheel speed sensor for wheel 1, wherein wheel speed from wheel 2 is used to control the braking of wheel 1 in accordance with the invention, and a second landing gear of the aircraft (wheels 3 and 4) that is fully operational.

FIGS. 2A-2C are schematic diagrams illustrating, respectively, an exemplary aircraft having bogie landing gear, a first bogie landing gear of the aircraft (wheels 1, 2, 5 and 6) having a faulty wheel speed sensor for wheel 1, wherein wheel speed from wheels 2 and 5 is used to control the braking of wheel 1 in accordance with the invention, and a second landing gear of the aircraft (wheels 2, 4, 7 and 8) that is fully operational.

DETAILED DESCRIPTION

Figure 3:
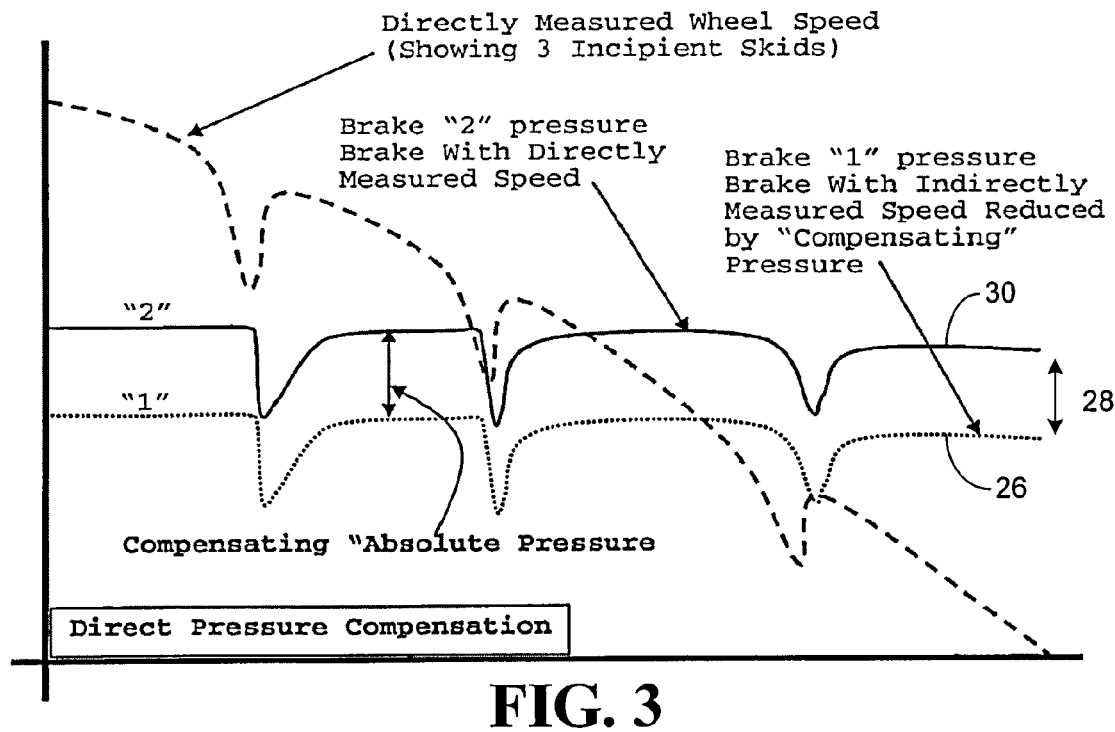
FIG. 3 is an exemplary plot showing brake pressure signals for wheels 1 and 2 of FIG. 1B, wherein the brake pressure signal for wheel 1 is lower than the brake pressure signal for wheel 2 by a predetermined or absolute pressure in accordance with the invention.

Because the invention was conceived and developed for use in an aircraft braking system, it will be herein described chiefly in this context. However, the principles of the invention in their broader aspects can be adapted to other types of braking systems, such as automobile brakes, truck brakes, etc.

The term "malfunctional" as used herein refers to abnormal, faulty and/or non-functional operation of a device, such as a sensor. A malfunctional sensor, for example, may not output any data, or it may have sufficient operational capability to output data (even valid data). However, due to some issue with the sensor, the data cannot be relied upon for normal operation of other components or systems. The term "functional" as used herein refers to normal operation of a device, such as a sensor.

Additionally, brake control for a functional wheel/brake sensor combination may be referred to herein as direct brake control, while brake control for a malfunctional wheel/brake/sensor combination may be referred to herein as indirect brake control.

The method described herein enables anti-skid braking capability even when one or more wheel speed sensors on one or more wheel/brake/sensor combinations of a vehicle malfunction. More particularly, when a wheel speed sensor malfunctions, wheel speed data from one or more functional wheel speed sensors is used as the wheel speed data for the malfunctioning wheel/brake/sensor combination. Preferably, the data is obtained from wheels that are physically near the malfunctioning wheel/brake/sensor combination. However, the method may be implemented using data from one or more wheels that are not physically near the malfunctional wheel/brake/sensor combination. Although the method described herein is not as efficient as having actual speed data for all wheel/brake/sensor combinations, it enables anti-skid brake functionality to remain operational (as opposed to disabling anti-skid functionality due to a malfunctioning sensor).

Referring to FIGS. 1A and 2A, there is shown exemplary aircraft 10 and 12 having twin landing gear configuration 14 and bogie landing gear configuration 16, respectively. As is evident, the exemplary twin landing gear configuration 14 includes four main wheels, and the exemplary bogie landing gear configuration 16 includes eight main wheels. As will be appreciated by those having ordinary skill in the art, other configurations are possible, e.g., six-wheel bogie gears, two wheels on a "twin" gear, etc. The method described herein can be applied to any aircraft/gear configuration.

Each wheel/brake/sensor combination on the MLG (Main Landing Gear) includes a wheel speed sensor 18 and brake 20. Each wheel speed sensor 18 may be a single channel sensor, although multi-channel sensors may be used to mitigate the potential loss of a speed signal. The wheel speed sensor 18 may be any conventional wheel speed sensor, and the data provided by the wheel speed sensor may be analog data or digital data, for example.

In a first embodiment of a braking method in accordance with the invention, wheel speed data from a nearest functional or "good" wheel/brake/sensor combination 22 (e.g., a wheel that is physically nearest to the wheel with the malfunctioning sensor) is used as the speed signal for the malfunctional or "bad" wheel/brake/sensor combination 24. For example, in FIGS. 1A-1C, if sensor 18 for wheel "1" malfunctions, then sensor data from wheel "2" data can be used to calculate wheel speed for wheel "1". Similarly, and with reference to FIGS. 2A-2C, if sensor 18 for wheel "1" malfunctions, then sensor data from wheel "2" and/or wheel "5" can be used to calculate wheel speed for wheel "1".

When using wheel speed data from multiple wheel speed sensors 18 as wheel speed data for a wheel with a malfunctional wheel speed sensor 18, an average wheel speed (e.g., an average speed of two or more wheels with functional wheel speed sensors) may be calculated and used as the wheel speed for the wheel having the malfunctional sensor. For example, if the wheel speed sensor for wheel "1" malfunctions, then the wheel speed from wheels "2" and "5" can be used to calculate an average wheel speed, and this average wheel speed can be used as the wheel speed for wheel "1".

In addition to the above, the amount of brake pressure or brake torque that may be applied to the bad wheel/brake/sensor combination 24 has a level of uncertainty associated with it, since runway conditions of wheel "1" can be different than the conditions experienced by wheel "2" and/or wheel "5". To assure that wheel "1" does not skid, the brake pressure applied to the brake corresponding to the malfunctional wheel/brake/sensor combination 24 (e.g., wheel "1") can include a compensation factor for potential differences between runway coefficient of friction between wheel "1" and wheel "2". For example, the brake pressure applied to the malfunctional wheel/brake/sensor combination 24 can be limited to a value that is less than the brake pressure applied to the functional wheel/brake/sensor combination 22 by a fixed or variable delta. This can be accomplished in a number of different ways, as described in more detail below.

In a first manner of adjusting the brake pressure applied to the malfunctional wheel/brake/sensor combination 24, the brake pressure signal provided to the malfunctional wheel/brake/sensor combination 24 is less than the brake pressure signal from the nearest functional wheel/brake/sensor combination 22 by a predetermined compensation or absolute pressure. This is illustrated graphically in FIG. 3, wherein the brake pressure signal 26 for the malfunctional wheel/brake/sensor combination 24 is below the pressure signal 30 provided to the nearest functional wheel/brake/sensor combination 22 by a fixed value 28. The compensating pressure could be an absolute pressure, e.g., the malfunctioning wheel/brake/sensor combination 24 pressure is at least 200 psi less than the functional wheel/brake/sensor combination 22. Another method could be that the pressure signal for the malfunctional wheel/brake/sensor combination 24 is limited to a fixed percentage (e.g., 90 percent) of the pressure supplied to the functional wheel/brake/sensor combination 22.

Figure 4:
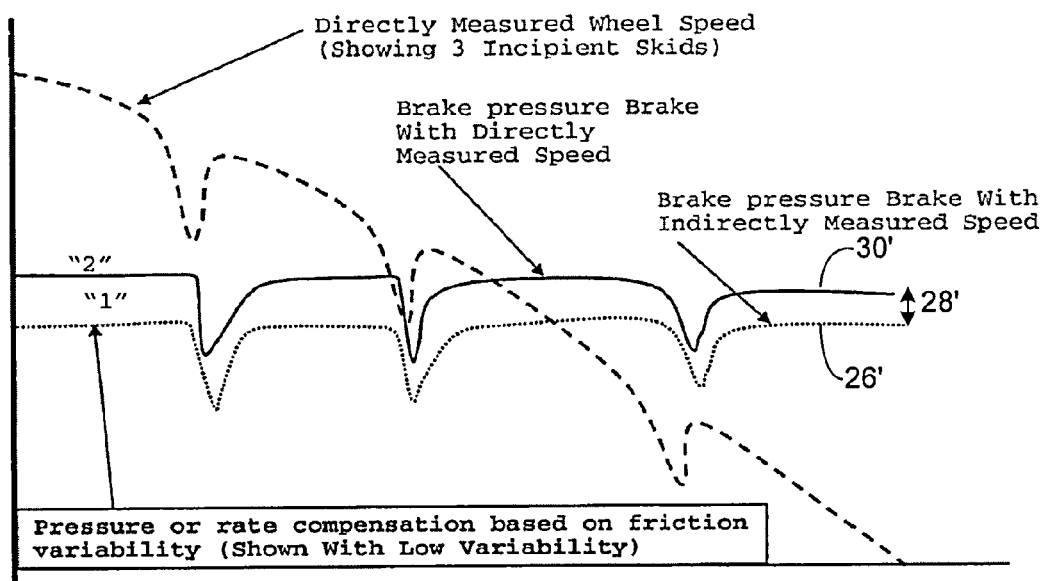
FIG. 4 is an exemplary plot showing brake pressure signals for wheels 1 and 2 of FIG. 1B, wherein the brake pressure signal for wheel 1 is lower by a predetermined or absolute pressure and skewed (rate compensation) relative to the brake pressure signal for wheel 2 in accordance with the invention.

Additionally, runway coefficient variability may be evaluated. For example, if the wheel of the functional wheel/brake/sensor combination 22 has a coefficient of friction that does not significantly vary during stopping, then it can be concluded that the runway does not have a patchy or high variability in the surface friction. In this case, the brake pressure provided to the malfunctional wheel/brake/sensor combination 24 can closely mimic the brake pressure provided to the functional wheel/brake/sensor combination 22, e.g., the two brake signals may be identical or almost identical, or the limit placed on the brake signal for the brake corresponding to the malfunctional wheel/brake/sensor combination may be the same as the actual brake signal applied to the brake corresponding to the functional wheel/brake/sensor combination. FIG. 4 illustrates this approach, wherein brake pressure signals for the functional and malfunctional wheel/brake/sensor combinations are shown on runways that are non-patchy/low variability in surface friction. More specifically, the brake pressure signal 26' provided to the malfunctional wheel/brake/sensor combination 24 closely follows the profile of the brake signal 30' provided to the functional wheel/brake/sensor combination 22. As can be seen in FIG. 4, the signal 26' provided to the malfunctional wheel/brake/sensor combination 24 has a similar profile to that of signal 30' provided to the functional wheel/brake/sensor combination 22. The main difference between the two signals 26' and 30' is that the signal 26' is slightly offset from the signal 30' by a fixed pressure 28', and its profile is slightly skewed from that of signal 30'. Exemplary limits for the brake pressure signal of the malfunctional wheel/brake/sensor combination can be 50% of the brake pressure of the functional wheel/brake/sensor combination (assuming runway friction is constant and no anti-skid is detected on the functional wheel/brake/sensor combinations). If the runway is patchy friction surface, then the limit may be reduced to 25% of the functional wheel/brake/sensor combination. Further, due to high variability in carbon brakes, the limit also may be set to 50% of the brake pressure for the functional wheel/brake/sensor combination. Steel brakes have less variability and thus can have the limit set at 75% of the brake pressure applied to the functional wheel/brake/sensor combination.

If an incipient skid is not detected for the wheel of the functional wheel/brake/sensor combination (i.e., the directly controlled brake), then the brake pressure applied to the brake of the malfunctional wheel/brake/sensor combination (i.e., the indirectly controller brake) can be set with confidence that a skid will not occur. For example, first assume the two brakes have nearly the same gain characteristics (that is for a given brake pressure they generate nearly the same torque) then the brake pressure for the malfunctional wheel/brake/sensor combination can be nearly equal to the brake pressure for the functional wheel/brake/sensor combination. Also if anti-skid activity is taking continuously place, this also indicates a consistent, but lower, coefficient of friction. Again, there is a high level of confidence that the brake pressure applied to the malfunctional wheel/brake/sensor combination will not cause a skid. In both cases there is an indication of a homogeneous runway surface. If the functional wheel/brake/sensor combination is in and out of skids, or constant adjustments are being made to avoid skids, the pressure should be significantly lowered, perhaps even to zero, to avoid skidding of the wheel corresponding to the malfunctional wheel/brake/sensor combination. The amount of safety margin applied to the brake pressure signal is dependent on the amount of information (number of wheels), landing gear geometry, type of brake (carbon or steel) and the type of braking stop (low speed, RTO, etc.).

Figure 5:
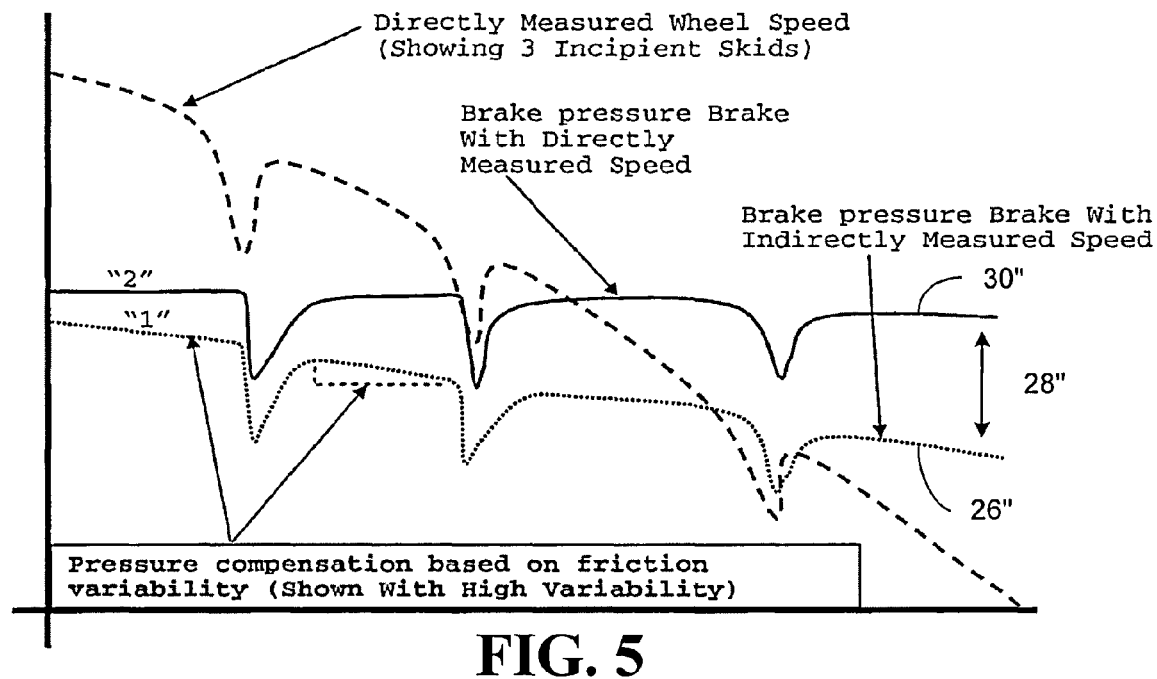
FIG. 5 is an exemplary plot showing brake pressure signals for wheels 1 and 2 of FIG. 1B, wherein the brake pressure signal for wheel 1 is lower than the brake pressure signal for wheel 2 by a variable amount in accordance with the invention.

Conversely, a "patchy" runway or runaway with high variability in surface friction may call for a more conservative brake pressure as shown in FIG. 5. The pressure signal shown in FIG. 5 may be for a wheel/brake/sensor combination that becomes highly "grabby" (high brake coefficient) near the end of the braking stop. It can also be that at low speeds there may be low or insufficient resolution in the sensor data (generally a wheel speed sensor has less content at lower speeds). In such situations, it is preferable to be more conservative.

In FIG. 5, the pressure signal 26" provided to the malfunctional wheel/brake/sensor combination 24 follows the general profile of the brake pressure signal 30" provide to the functional wheel/brake/sensor combination 22, but the pressure limit placed on the brake corresponding to the malfunctional sensor includes a pressure offset signal 28" that increases with time (e.g., the pressure differential between the signal 26" and 30" increases with time). The rate of change between pressure signals is a function of the brake characteristics.

For example, when brake pressure is initially applied to brakes of both the functional and malfunctional wheel/brake/sensor combinations, the pressure applied to the brake of the malfunctional wheel/brake/sensor combination is slightly less than the pressure applied to the brake of the functional wheel/brake/sensor combination. As can be seen in FIG. 5, the offset increases with time (and thus the malfunctional brake signal limit decreases) such that a difference between the braking pressure of the functional and malfunctional wheel/brake/sensor combinations increases. The rate of change of the offset is also a function of the brake characteristics.

Figure 6:
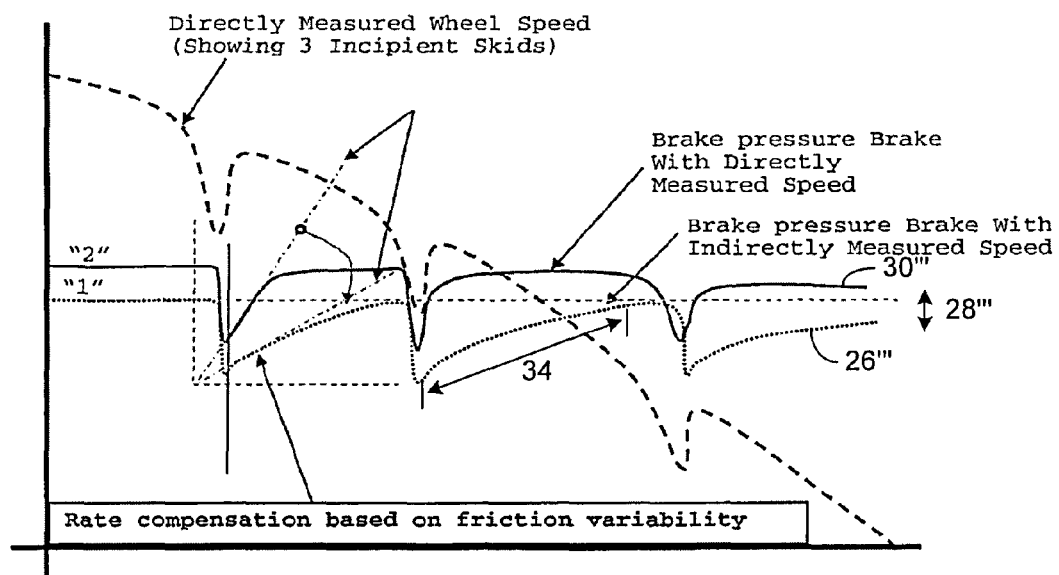
FIG. 6 is an exemplary plot showing brake pressure signals for wheels 1 and 2 of FIG. 1B, wherein the brake pressure signal for wheel 1 includes a skew or rate compensation based on friction variability in accordance with the invention.

In addition to compensating the pressure proportional to variability, the algorithm "gain" (i.e., the rate of change coefficients) can be modified to assure that a recovery (increasing brake pressure after a skid occurs) increases at a slower rate for runways with high variability in friction coefficients (patchy runway), and at a faster rate for runways with low variability in friction coefficients. FIG. 6 illustrates this feature, where in addition to the pressure offset signal 28''' increasing with time, the recovery rate 34 between skids also is altered such that the profile of the brake pressure signal 26''' provided to the malfunctional wheel/brake/sensor combination 24 is different than that of the signal 30''' provided to the functional wheel/brake/sensor combination 22. This may be accomplished, for example, by implementing a different gain factor to the pressure signal 26''' (e.g., a lower proportional and/or integral gain). Alternatively, the brake signal for the malfunctional wheel/brake/sensor combination may be implemented via a filter having a variable time constant (e.g., the signal is passed through the filter prior to being supplied to the brake).

Thus, not only can magnitude adjustments be made to accomplish anti-skid braking control in accordance with the invention, but other adjustments, such as the "rate" of pressure application, etc., also can be made to accomplish anti-skid braking control.

The brake pressure also can be based on the variability of the conditions. For example, if the direct reading wheel/brake/sensor combination is in and out of anti-skid, this may indicate "patchy" or a highly variable runway coefficient of friction. The pressure applied to the malfunctioning wheel/brake/sensor combination would then be further lowered (or set to zero pressure) to assure that the malfunctional wheel/brake/sensor combination does not skid.

Further, prior to a failure (e.g., while the wheel/brake sensor combination is functional) the brake "gain" and overall performance levels can be gathered. This information then can be used when a failure does occur so as to provide another level of compensation for the braking level.

Figure 7:
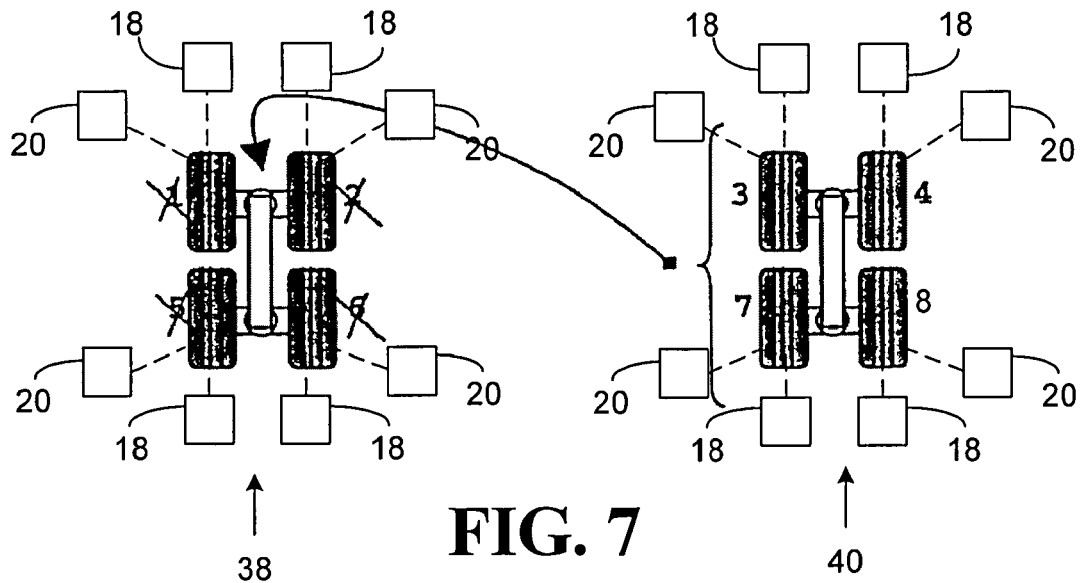
FIG. 7 is a schematic diagram showing complete failure of all speed sensors on one landing gear, and using speed sensors from a different landing gear so as to implement anti-skid brake control in accordance with the invention.

In the event of multiple sensor failures, the "insertion" of good wheel speed data can continue until all but one wheel speed sensor remains. Obviously with less information, extrapolating the true environment for a variety of wheels based on a single wheel provides a higher level of uncertainty. However, some level of braking can occur without complete loss of anti-skid. In FIG. 7, a severe case is shown where all wheel speed sensors have malfunctioned on landing gear 38 (e.g., the sensors for wheels 1, 2 5 and 6 have malfunctioned). In this example the speed information from landing gear 40 can be used to maintain a level of braking on landing gear 38. Again, the ability to control the brakes on the opposite gear depends primarily on the anti-skid efficiency required and the variability of the runway's surface friction. It is not realistic to expect the braking efficiency of the left gear to be the same as the right. Also, with the physical distance between the gears, the left gear will certainly require a higher level of pressure compensation (less pressure) to assure the tires do not skid. Note: If the aircraft turns (yaws) during landing, the pilot may react by letting up on the right brake pedal. In this case the right gear would drop out of anti-skid which increases the level of confidence that the subordinate wheel is also not skidding. Without anti-skid activity the percent of subordinate brake pressure can be increased from previous levels.

The method described herein may be implemented in a computer controller, for example, so as to carry out or supplement braking of the vehicle. For example, a computer program may be loaded into memory of the controller and, when executed by the controller, fault tolerant anti-skid braking operation described herein is executed. Such a controller may be located in the avionics bay of an aircraft, for example, and operatively coupled to the brake actuators and wheel speed sensors on the landing gear, and to a brake pedal in the cockpit.

Figure 8:
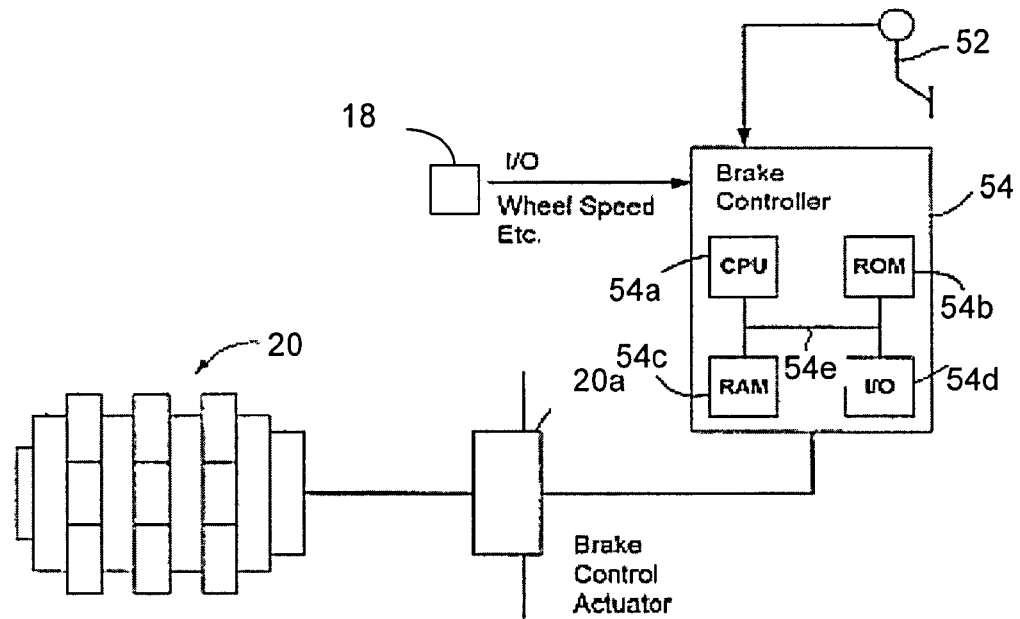
FIG. 8 is a schematic diagram of an exemplary aircraft brake control system that can be used to implement the method in accordance with the invention.

Referring to FIG. 8, a schematic diagram of an exemplary aircraft brake control system 50 is shown. The system 50 includes a brake pedal 52 located in the aircraft, wherein the brake pedal 52 generates a signal proportional to an amount of pedal deflection or desired braking force. The signal generated by the brake pedal 52 is provided to a brake controller 54, which also receives data relating to wheel speed from wheel speed sensors 18. The brake controller 54 can include a microprocessor 54a, read only memory (ROM) 54b, random access memory (RAM) 54c, and input/output module 54d, each of which are communicatively coupled via a system bus 54e or the like. A braking program in accordance with the invention can reside in ROM 54b and can be executed by the microprocessor 54a so as to implement a braking function as described herein.

The brake controller 54 is operatively coupled to a brake actuator 20a of each brake 20. Exemplary brake actuators include one or more hydraulic valves, electric motors, or the like. Based on a braking command from the pedal 52 and data relating to the wheel speed, the braking controller 54 provides a signal to the brake actuator 20a so as to implement the braking command while preventing wheel skid (anti-skid control), control the deceleration of the wheel, or other speed related logic functions of brake control.

Figure 9:
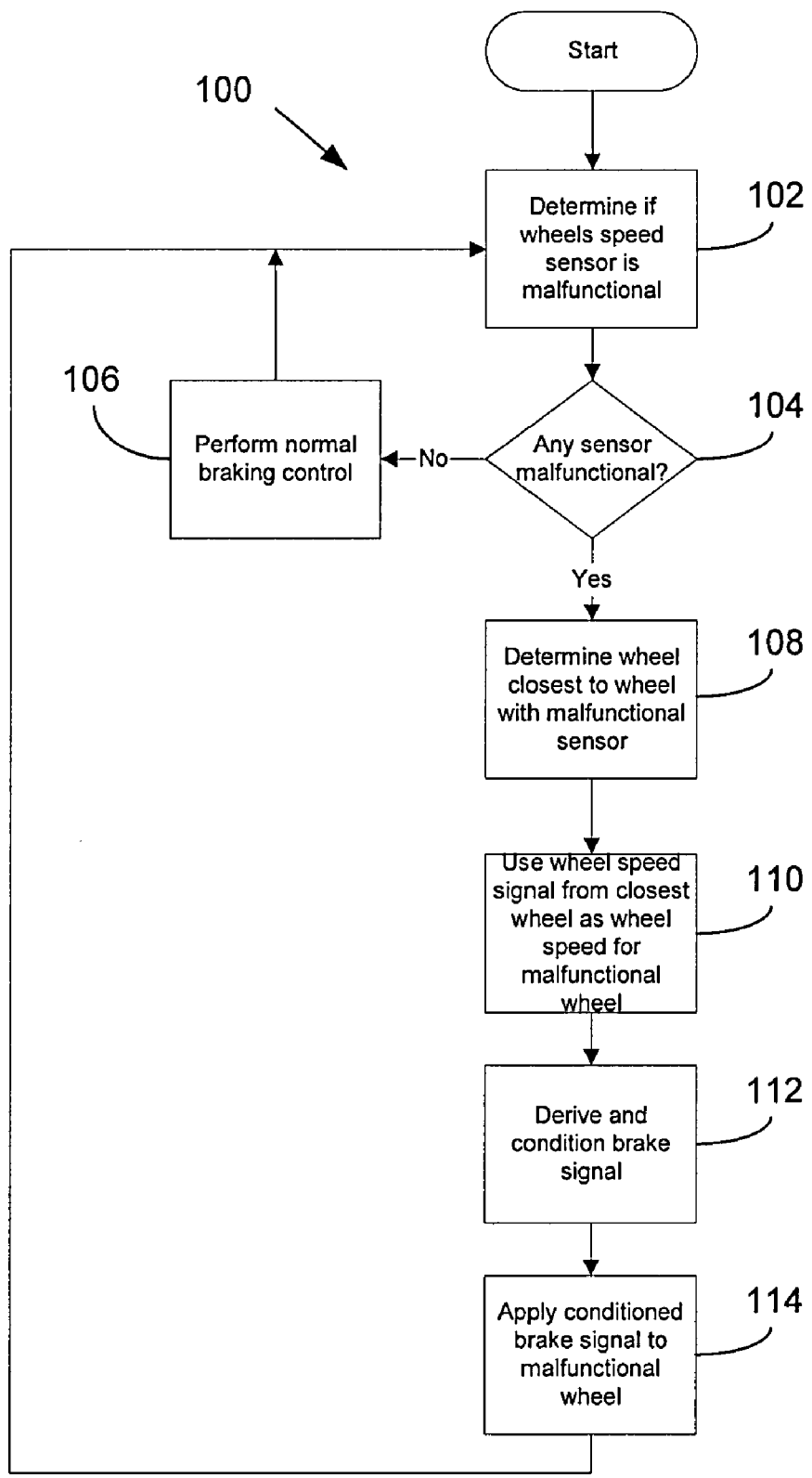
FIG. 9 is a flow chart illustrating exemplary steps for implementing braking in accordance with the invention.

Referring now to FIG. 9, a flow diagram 100 illustrating an exemplary method for implementing anti-skid braking control is provided. The flow diagram includes a number of process blocks arranged in a particular order. As should be appreciated, many alternatives and equivalents to the illustrated steps may exist and such alternatives and equivalents are intended to fall with the scope of the claims appended hereto. Alternatives may involve carrying out additional steps or actions not specifically recited and/or shown, carrying out steps or actions in a different order from that recited and/or shown, and/or omitting recited and/or shown steps. Alternatives also include carrying out steps or actions concurrently or with partial concurrence.

Beginning at block 102, the wheel speed sensors 18 are checked to determine if any sensors are malfunctioning. For example, a malfunctioning sensor 18 may be identified by a fault signal or the like originating at the sensor (e.g., the sensor itself detects that it is malfunctioning). Such indication may be provided to the brake controller 54 via a hard-wired contact signal or via a digital communication signal, for example. Alternatively, or in conjunction with the above, the data obtained from each wheel speed sensor 18 may be compared with data from other wheels speed sensors 18 on the vehicle. If one sensor provides data that is inconsistent (e.g., a wrong direction, significant speed error, etc.) with data from other sensors, then the one sensor may be considered to be malfunctioning. As will be appreciated, this approach may be applicable even when multiple wheels provide inconsistent data, provided there are sufficient wheel speed sensors (e.g., a majority) operating in a normal state.

Next at block 104, a check is performed to see if the number of malfunctioning sensors 18 is greater than zero. If no sensors are malfunctioning, then at block 106 normal braking takes place and the method moves back to block 102. However, if one or more wheel speed sensors are malfunctioning, then at block 108 it is determined which wheel or wheels with functional wheel speed sensors 18 are closest to the wheel or wheels with malfunctioning sensors 18. This can be determined via a lookup table, for example, where the physical configuration of the wheels is stored in memory 54b of the controller 54.

Next at block 110, the wheel speed for the nearest wheel or wheels with a functioning wheel speed sensor is used as the wheel speed for the wheel with the malfunctioning wheel speed sensor. This can include using a single functioning wheel speed sensor to provide wheel speed data for the wheel with the malfunctioning wheel speed sensor, or calculating an average wheel speed from a plurality of functioning wheel speed sensors and using the average speed as the wheel speed for the wheel with the malfunctioning wheel speed sensor. At block 112, the brake signal is derived based on the wheel speed from the nearest wheel, and the brake signal then is conditioned, for example, based on predetermined criteria.

Conditioning may include limiting the derived brake signal to a fixed or variable offset below the brake signal applied to the functional wheel/brake/sensor/sensor combination, or limiting the derived brake signal to a fixed or variable percentage of the brake signal applied to the functional wheel/brake/sensor combination. Other signal conditioning may include changing a recovery rate of the derived brake signal after a wheels skid is detected. For example, as a wheel skid is detected, brake pressure may be reduced on the corresponding brakes so as to stop the skid. Upon detecting that the wheels are no longer skidding, brake pressure can be reapplied to the brakes, wherein the brake signal to the wheel with the malfunctioning wheel speed sensor is ramped back up to a desired reference level at a rate that is slower or skewed from the signal provided to the wheel with the functioning wheel speed sensor. Once the signal has been conditioned, the signal is applied to the appropriate brake.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method for deriving a brake signal indicative of a stopping force to be applied by at least one brake of a vehicle, said vehicle including a plurality of wheels, each wheel including a corresponding wheel speed sensor for detecting wheel speed and a brake for providing a stopping force to the wheel, comprising:
    determining if the wheel speed sensors are functional or malfunctional; and
    generating a brake signal for a brake corresponding to a malfunctional wheel speed sensor based on wheel speed data from a functional wheel speed sensor, wherein generating the brake signal includes:
    applying a compensation factor to the generated brake signal to derive a compensated brake signal; and
    using the compensated brake signal as the brake signal for the brake corresponding to the malfunctional wheel speed sensor,
    wherein applying the compensation factor includes limiting the compensated brake signal to a level less than a normal brake signal provided to a brake corresponding to the functional wheel speed sensor.

2. The method according claim 1, wherein applying the compensation factor includes varying, after a wheel skid, a recovery rate of the compensated brake signal relative to a recovery rate of the normal brake signal.

3. The method according to claim 2, wherein varying the recovery rate includes increasing the compensated brake signal at a rate that is slower than a rate of increase of the normal brake signal.

4. The method according to claim 2, wherein varying the recovery rate for the compensated brake signal includes using a first recovery rate for high variability in friction coefficients between a surface and the wheels, and using a second recovery rate for low variability in friction coefficients between the surface and the wheels, wherein the second recovery rate is faster than the first recovery rate.

5. The method according to claim 1, wherein limiting the compensated brake signal includes limiting the compensated brake signal to a fixed or variable level below the normal brake signal.

6. The method according to claim 5, wherein limiting the compensated brake signal to a variable level includes a level that varies with respect to time.

7. The method according to claim 1, wherein limiting the compensated brake signal includes limiting the compensated brake signal to be less than a non-negative fraction of the normal brake signal.

8. The method according to claim 1, wherein generating the brake signal includes using a wheel speed data from a wheel that is physically nearest to the wheel with the malfunctioning wheel speed sensor.

9. A system for braking a vehicle having a plurality of wheels, comprising:
    a plurality of brakes, each brake of the plurality of brakes corresponding to one wheel of the plurality of wheels;
    a plurality of wheel speed sensors, each wheel speed sensor of the plurality of wheel speed sensors corresponding to one brake of the plurality of brakes;
    a brake controller operatively coupled to the plurality of brakes and to the plurality of wheel speed sensors, said brake controller including logic that determines if the wheel speed sensors are functional or malfunctional; and
    logic that generates a brake signal for a brake corresponding to a malfunctional wheel speed sensor based on wheel speed data from a functional wheel speed sensor wherein the logic that generates the brake signal includes:
    logic or code that applies a compensation factor to the generated brake signal to derive a compensated brake signal; and
    logic or code that uses the compensated brake signal as the brake signal for the brake corresponding to the malfunctional wheel speed sensor,
    wherein the logic or code that applies the compensation factor includes logic or code that limits the compensated brake signal to a level less than a normal brake signal provided to a brake corresponding to the functional wheel speed sensor.

10. The system according to claim 9, wherein logic or code that applies the compensation factor includes logic or code that varies, after a wheel skid, a recovery rate of the compensated brake signal relative to a recovery rate of the normal brake signal.

11. The system according to claim 10, wherein the logic or code that varies the recovery rate includes logic or code that increases the compensated brake signal at a rate that is slower than a rate of increase of the normal brake signal.

12. The system according to claim 10, wherein logic or code that varies the recovery rate for the compensated brake signal includes logic or code that uses a first recovery rate for high variability in friction coefficients between a surface and the wheels, and uses a second recovery rate for low variability in friction coefficients between the surface and the wheels, wherein the second recovery rate is faster than the first recovery rate.

13. The system according to claim 9, wherein the logic or code that limits the compensated brake signal includes logic or code that limits the compensated brake signal to a fixed or variable level below the normal brake signal.

14. The system or controller according to claim 13, wherein the logic or code that limits the compensated brake signal to a variable level includes logic or code that uses a level that varies with respect to time.

15. The system according to claim 9, wherein the logic or code that limits the compensated brake signal includes logic or code that limits the compensated brake signal to be less than a non-negative fraction of the normal brake signal.

16. The system according to claim 9, wherein the logic or code that generates the brake signal includes logic or code that uses a wheel speed data from a wheel that is physically nearest to the wheel with the malfunctioning wheel speed sensor.

* * * * *